US006427964B1

(12) United States Patent
Hillstrom et al.

(10) Patent No.: US 6,427,964 B1
(45) Date of Patent: Aug. 6, 2002

(54) FLAG HOLDER BRACKET FOR SIGN STAND

(75) Inventors: David U. Hillstrom; Yevgeniy M. Levin, both of Novi, MI (US)

(73) Assignee: Marketing Displays International, Farmington Hills, MI (US)

(*) Notice: Subject to any disclaimer, the term of this patent is extended or adjusted under 35 U.S.C. 154(b) by 0 days.

(21) Appl. No.: 09/507,763

(22) Filed: Feb. 18, 2000

(51) Int. Cl.[7] ................................................ A01K 97/10

(52) U.S. Cl. ........................... 248/538; 40/603; 40/610; 248/314; 248/539; 403/396; 403/397

(58) Field of Search ............................. 248/121, 219.2, 248/221.11, 538, 534, 539, 292.13, 127, 160, 900, 314, 309.1; 40/606, 607, 608, 610, 611, 612, 603; 118/28 R, 173

(56) References Cited

U.S. PATENT DOCUMENTS 1,467,621 A * 9/1923 Mahoney .................... 248/534
1,677,379 A * 7/1928 Ames ......................... 248/538
1,744,196 A * 1/1930 Ames ......................... 248/538
2,665,103 A * 1/1954 Flora et al. ................. 248/314
3,178,138 A * 4/1965 Hessdoerfer et al. ....... 248/539
4,433,935 A * 2/1984 Main et al. .............. 248/125.3
4,507,887 A 4/1985 Seely
4,569,499 A 2/1986 Seely
4,572,473 A 2/1986 Seely
4,592,158 A 6/1986 Seely
5,089,803 A * 2/1992 Bohn ........................ 116/28 R
5,438,782 A * 8/1995 Belobraydich et al. ....... 40/610
5,472,162 A 12/1995 Mason
5,725,186 A 3/1998 Hillstrom et al.
5,829,731 A * 11/1998 Dean .......................... 248/538
6,047,941 A * 4/2000 Kulp et al. .......... 248/219.3 X
6,056,250 A * 5/2000 Hillstrom et al. ......... 40/607 X

* cited by examiner

*Primary Examiner*—Leslie A. Braun
*Assistant Examiner*—Tan Le
(74) *Attorney, Agent, or Firm*—Harness, Dickey & Pierce, P.L.C.

(57) ABSTRACT

A flag holder for use on a sign stand which includes a support member and a spring member so configure to releasably secure a plurality of flags. The support member includes a mounting surface adaptable to secure the flag holder to the sign stand, a guide pocket or flange extending from the mounting surface, and a base flange extending from the mounting surface to support the end of the staff. The spring member of the flag holder is secured to the support member and engages the flag staff. The spring member applies enough force on the flag staff to prevent displacement of the flag, yet allows the staff to be easily inserted and removed.

20 Claims, 6 Drawing Sheets

FIG 4
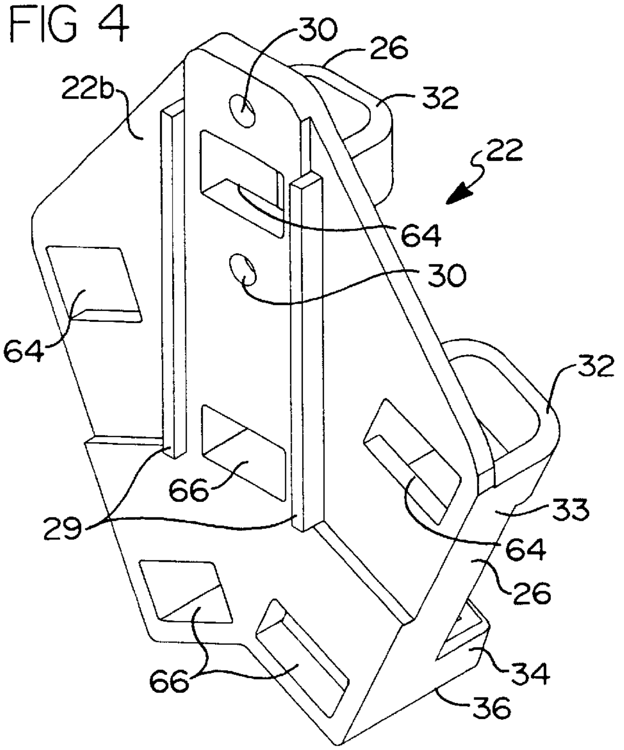
FIG 5
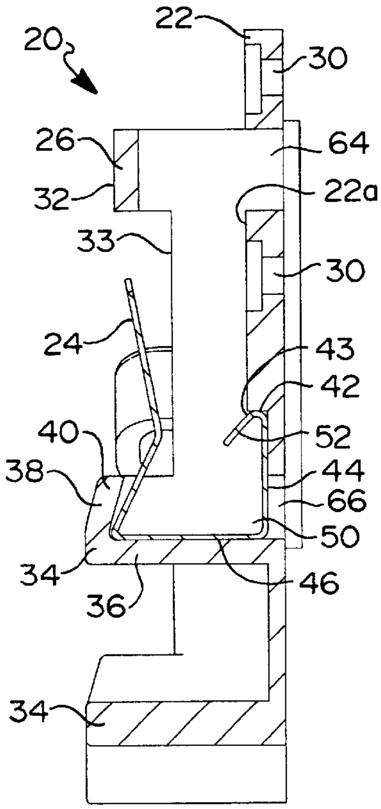
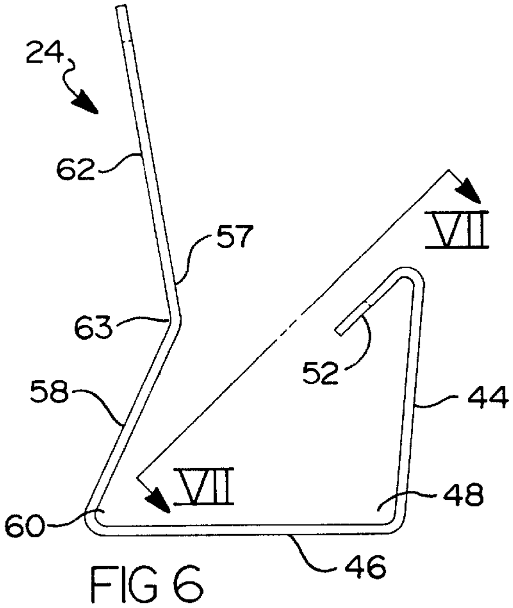
FIG 6
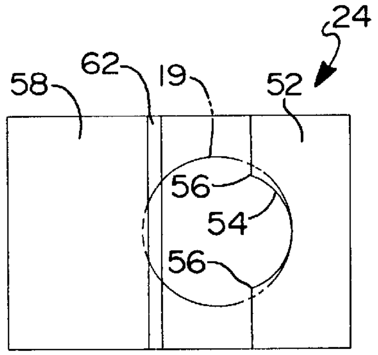
FIG 7

FIG 13
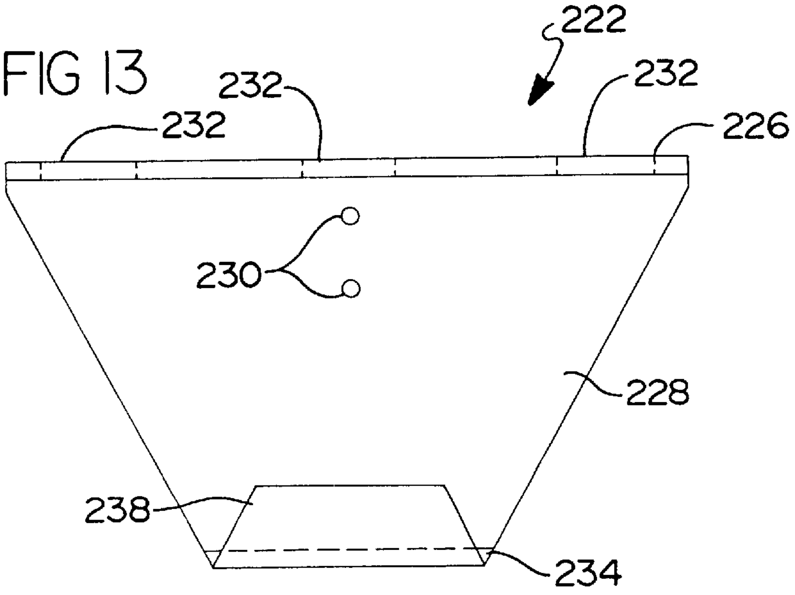
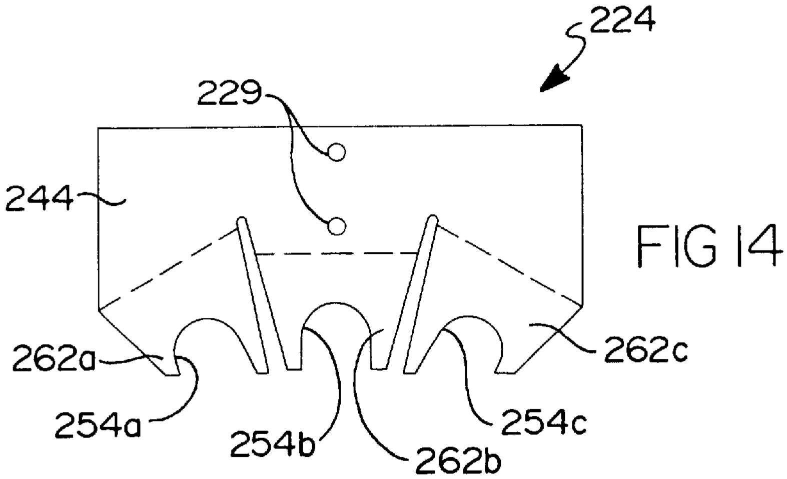
FIG 14
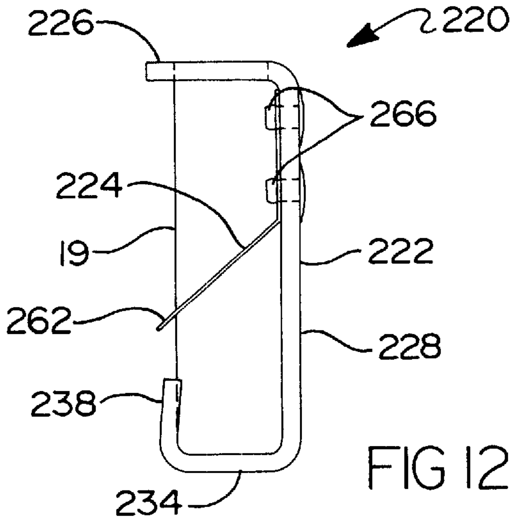
FIG 12

FIG 15
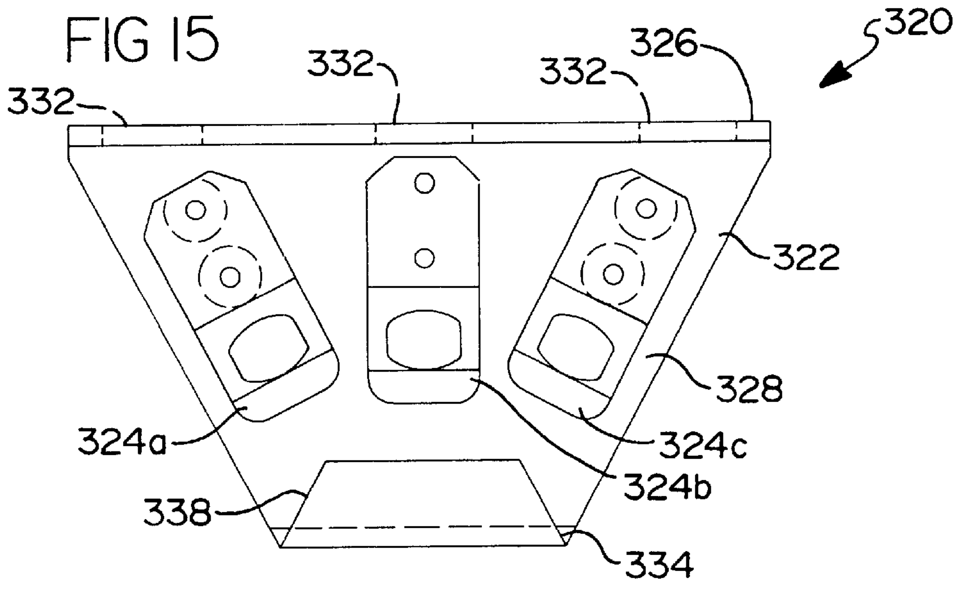
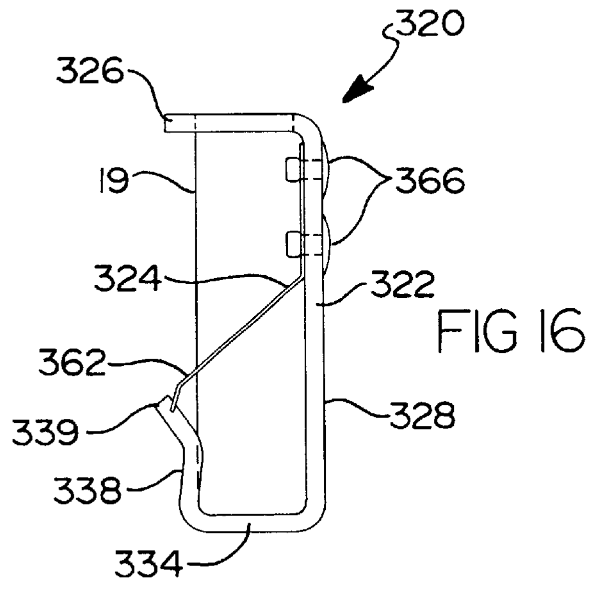
FIG 16
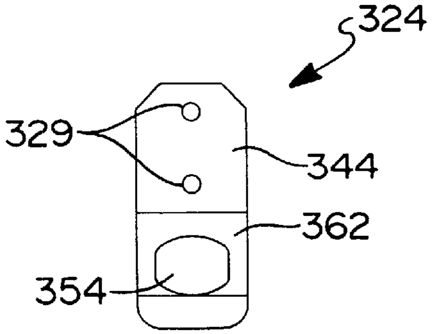
FIG 17

FIG 18
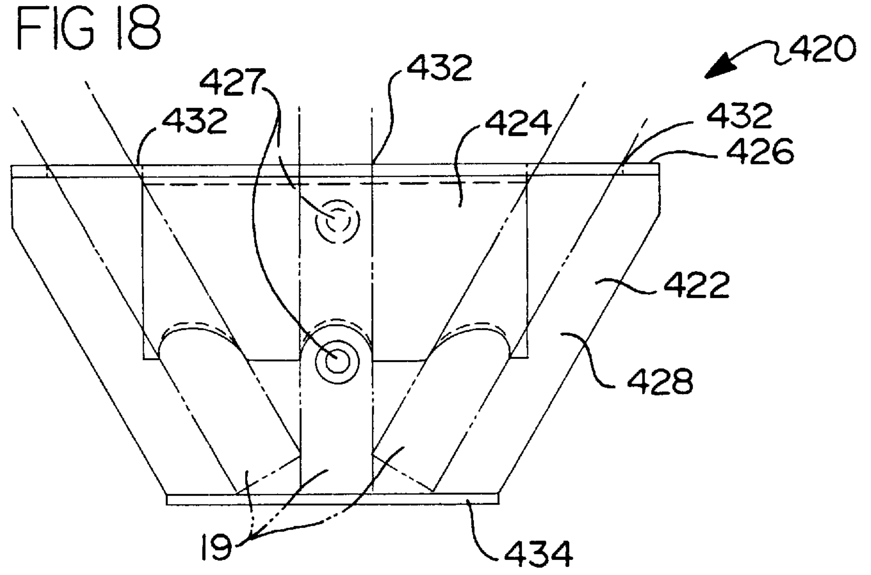
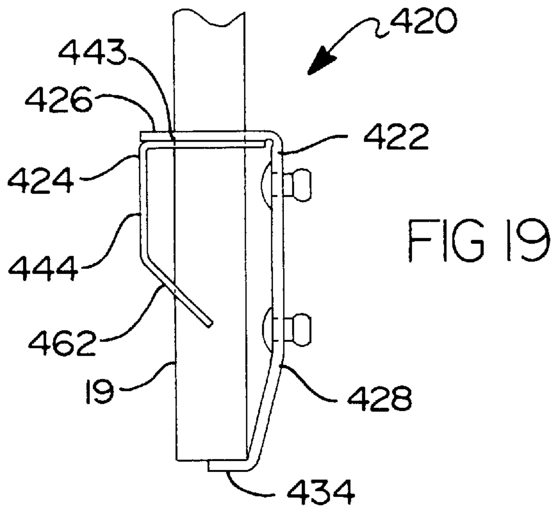
FIG 19
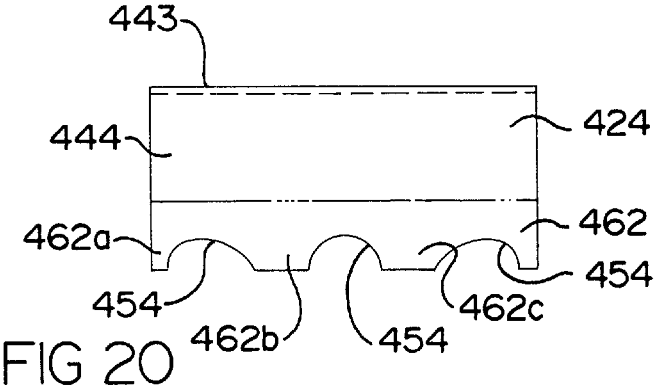
FIG 20

FLAG HOLDER BRACKET FOR SIGN STAND

BACKGROUND OF THE INVENTION

1. Technical Field

The present invention relates generally to sign and stand devices for signs or other display devices, and more particularly to an improved apparatus used on a sign stand for holding flags.

2. Discussion

Numerous sign stand devices have been designed for displaying advertisements and information to the public. On construction sites, for example, such signs are typically positioned on an upright member of sign stands that are either anchored in the ground, held in place by sand bags or other heavy objects, or spring-mounted on bases which allow them to bend or deflect relative to the base without tipping over under high wind forces. Signs commonly used at construction sites or at roadside emergency situations are square, rectangular, or diamond in shape, flat in configuration, made of metal or wood, and have pertinent informative or warning messages or symbols on them. In addition, flexible roll-up retro-reflective signs are also being used today. These signs are made out of a heavy duty flexible and foldable material, such as vinyl or reinforced cloth or plastic.

In addition to the information displaying sign panel, sign stand devices may also include flags mounted on them to alert observers to the sign. These flags are generally mounted to the top of the upright member of the sign stand to provide high visibility to motorists that pass by them. Various devices are currently used to mount these flags onto the sign stand.

One such device is a steel bracket secured to the upper end of the upright member of the sign stand by means of conventional fasteners extending through mounting holes in a vertical portion of the bracket and through the upper end of the upright member. This bracket includes an upper horizontal portion, a vertical portion, an intermediate horizontal portion vertically spaced from the upper horizontal portion, and an angulated lower portion. The staffs of the flag are inserted through a number of openings in the upper horizontal portion of the first piece, through a corresponding number of openings in the intermediate horizontal portion, and abut the lower portion.

One disadvantage of this design is that the flags are not secured in the bracket holder. This makes them susceptible to inadvertently being separated from the bracket. For example, inclement weather conditions, especially high winds, may cause the flags to be blown out of the bracket.

A variation of the one piece steel bracket which addresses the problem of flag separation uses a second substantially U-shaped steel piece in association with the first steel bracket which functions as a locking mechanism to rigidly secure the flag staffs in place. The locking mechanism utilizes a pair of threaded fasteners such as nuts and bolts or screws to clamp the flag staff between the first and second brackets.

This bracket, like many of the other brackets presently in use for mounting or attaching such signs to the sign stands, is often difficult and time consuming to operate, and typically is relatively heavy and bulky thereby making them inconvenient for use in construction or emergency situations. Other notable drawbacks of the locking mechanism are increased weight, increased size, additional fabrication labor and additional cost which are a byproduct of the added U-shaped bracket. Furthermore, the threaded fasteners can become separated and lost from the flag holder rendering the locking mechanism unusable.

In addition, because the sign stands are often used in roadside locations, they on occasion became involved in collisions with motor vehicles. Both state and federal agencies have instituted various motor vehicle safety standards to address this issue. Specifically, NCHR-350 is a recently enacted federal law that relates to crash performance of roadside sign stands. In view of the more stringent requirements of NCHR-350, improvements may be required in the sign stands in order for them to meet these standards. In particular, some bracket designs currently in use may contribute to the poor performance of the sign stands during the tests because of their weight, size, and configuration.

Therefore, there is a need for an improved flag holder for use on a sign stand device which is relatively light in weight, compact in size, economical to produce, and which can be made operational with relative ease and expediency.

SUMMARY OF THE INVENTION

It is therefore an object of the present invention to provide a sign stand with a flag holder that can be set up and made operational with as little difficulty and as quickly as possible.

It is a further object of the present invention to provide a flag holder that is lightweight.

Another object of the present invention is to provide a flag holder that is economical to produce.

It is still another object of the present invention is to provide a flag holder that can accommodate different size flag staffs.

Accordingly, the present invention is directed to an improved flag holder that is mountable to a sign stand. The flag holder includes a support member and a spring member which allow a plurality of flag staffs to be secured in place. The support member has a mounting surface adaptable to secure the flag holder to the sign stand. The support member further includes a guide pocket or flange extending outwardly from the mounting surface. The guide flange has an opening formed therethrough to receive the flag staff. The support member also includes a base flange extending outwardly from the mounting surface. The spring member of the flag holder is secured to the support member and has a flange with an arcuate configuration which engages the flag staff, wherein the flange is releasably positionable to disengage the flag staff. The flange applies sufficient force on the flag staff to prevent flag separation, yet allows the staff to be easily inserted and removed. In addition, the flag holder is adaptive to accommodate various flag staff sizes.

The present invention uses this simple, elegant design to provide a flag holder that is lightweight and easily transportable. The support member of the flag holder may be formed of a plastic material which is lightweight and durable. The lightweight nature of the flag holder allows for convenient set-up and reduces the overall weight of the sign stand in order to better accommodate federal motor vehicle safety standards.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 4 is a rear perspective view of the support member of the flag holder shown in FIG. 3;

FIG. 5 is a cross-sectional side view of the flag holder as shown in FIG. 3;

FIG. 6 is a side view of the spring member illustrating a first preferred embodiment according to the principles of the present invention;

FIG. 7 is a cross-sectional view of the spring member taken along line VII—VII as shown in FIG. 6 further including a flag staff shown in phantom;

FIG. 12 is a side view of the flag holder as shown in FIG. 11;

FIG. 13 is a front view of the support member of the flag holder shown in FIG. 11;

FIG. 14 is a front view of the spring member as seen in FIG. 11;

FIG. 15 is a front view of the flag holder which illustrates a fourth preferred embodiment of the present invention;

FIG. 16 is a side view of the flag holder as seen in FIG. 15;

FIG. 17 is a front view illustrating the spring member as seen in FIG. 15;

FIG. 18 is a front view of the flag holder which illustrates a fifth preferred embodiment of the present invention;

FIG. 19 is a side view of the flag holder as seen in FIG. 18; and

FIG. 20 is a front view illustrating the spring member as seen in FIG. 18.

DETAILED DESCRIPTION OF THE PREFERRED EMBODIMENTS

Figure 1:
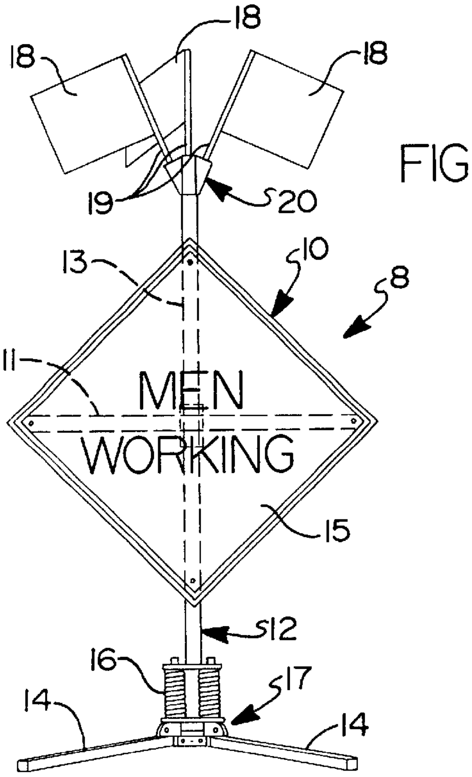
FIG. 1 is a front view of a portable sign stand having a flag holder according to the principles of the present invention.

As the drawings show preferred embodiments of the present invention, one skilled in the art will readily recognize that the principles of the invention are well adapted for application to devices other than sign and stand assemblies other than those shown in the drawings. Furthermore, one skilled in the art will readily appreciate that various adaptations of the preferred embodiments may be combined or otherwise modified without departing from the spirit and scope of the invention.

FIG. 1 shows a flag holder 20 in use on a sign stand 8 with a sign 10 mounted on an upright 12. The upright 12 is supported on the ground preferably by a plurality of ground-engaging legs 14 and a spring mechanism 16 which allow the sign 10 and upright 12 to deflect relative to the base assembly 17 in a downward direction when subjected to wind forces and then resiliently return to the normal upright position shown in FIG. 1. It is understood, of course, that the flag holder 20 of FIG. 1 may also be used with other types of sign stands or frame members, whether permanently anchored or portable.

The upright 12 may be composed of any conventional material which is sturdy enough to be used for the purpose described herein, but is preferably composed of a hollow metal construction, such as aluminum or steel. The cross-sectional shape of the upright 12 is preferably square (as shown in FIGS. 1 and 2), although it should be understood that the frame can have any suitable cross-sectional size and shape so long as it can be used as a stand for a construction sign or similar display.

The sign 10 has a large flexible and foldable sign panel 15 typically having a warning, message or symbol on one side and a pair of cross-braces 11 and 13 pivotally attached to one another on the other side. The flexible sign panel 15 is preferably composed of a heavy-duty material such as vinyl or reinforced cloth or plastic, for example. The cross-braces 11 and 13 are made of a relatively rigid material (such as fiberglass, metal, or wood) and serve to brace and support the flexible sign panel in its fully extended position. As shown in FIG. 2, one of the cross-braces 11 is pivoted to a horizontal position when the sign is mounted to the upright 12, while the other cross-brace 13 is vertically situated. Any of the attaching means known in the art may be used to retain the corners of the sign panel at the ends of the cross-braces 11 and 13 in order to erect the sign to its display configuration. A presently preferred configuration is the Duralatch® attachment system manufactured by Marketing Displays International, Inc. of Farmington Hills, Mich. When the sign 10 is removed from the upright 12 and is to be taken down, at least two comers of the flexible sign panel material are detached from the other ends of their corresponding cross-brace, and the cross-braces are pivoted to a generally parallel, mutually aligned relationship. The flexible sign panel 15 which remains attached to one of the cross-braces, may then be folded or rolled up around the mutually-aligned cross-braces for compact, convenient storage.

Figure 2:
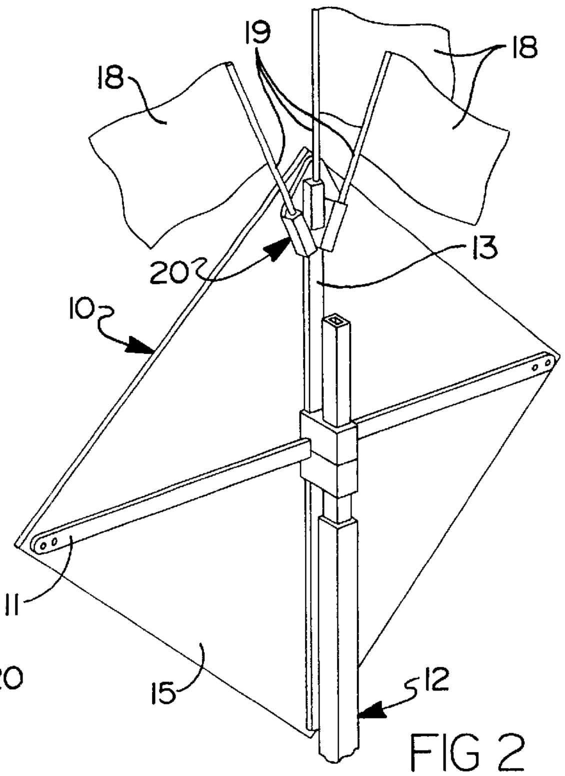
FIG. 2 is a partial rear perspective view of the portable sign stand shown in FIG. 1 depicting a first preferred embodiment of a flag holder according to the principles of the present invention.
Figure 3:
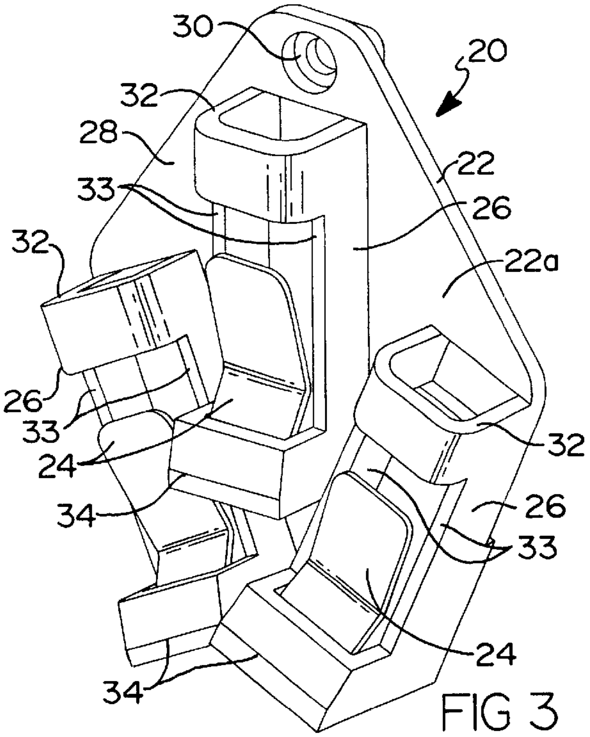
FIG. 3 is an enlarged front perspective view of the flag holder shown in FIG. 2.

As seen in FIGS. 1 and 2, a plurality of warning flags 18 at the top of the upright 12 are held in place by the flag holder 20. Flags 18 are of the type having a flag staff 19 which are commonly used as a high level warning for approaching traffic. Although the flag holder of the present invention is shown in the drawings as preferably holding three flags, it would be understood by one skilled in the art that the flag holder may be adapted to hold more or less than three flags without departing from the spirit and scope of the present invention.

FIGS. 2–7 illustrate a first preferred embodiment of the present invention. The flag holder 20 includes a support member 22 and three spring members 24 disposed in guide pockets 26 for releasably securing the flag staff 19 to the sign stand 8. The support member 22 is preferably diamond-shaped and includes a web 28 interconnecting the guide pockets 26 which extend outwardly from a front face 22*a* of the support member 22. The diamond-shaped configuration of the support member 22 minimizes the width of the flag holder 20 to make it light and compact.

The flag holder 20 of the present invention may be mounted to the sign stand 8 by a variety of methods. As is shown in FIG. 4, the back side 22*b* of the support member 22 has a pair of guide ribs 29 extending therefrom. In a first preferred mounting method, the guide ribs 29 are used to slide the support member 22 directly onto the vertical cross-brace 13 (not shown) of the sign assembly 10 to align the flag holder 20 into mountable position. The flag holder 20 can then be secured to the cross-brace 13 by suitable fastening means, such as threaded fasteners, rivets, or snap-fit. This method is preferably used in conjunction with the Duralatch® attachment system manufactured by Marketing Displays International, Inc. of Farmington Hills, Mich.

The compact configuration of the flag holder 20 along with its ability to be mounted directly to the cross-brace 13 allow the flag holder 20 to remain attached to the sign assembly even when the sign assembly is not in use. When the sign 10 is removed from the frame member 12 and is to be taken down, at least two corners of the flexible sign panel material are detached from the other end of their corresponding cross-brace. The cross-braces 11 and 13 are pivoted to a generally parallel, mutually aligned relationship. The flexible sign panel 15, which remains attached to the cross-braces 11 and 13, along with the flag holder 20, which also remains attached to one of the cross-braces 11 and 13, may then be folded or rolled up around the mutually aligned cross-braces for compact, convenient storage.

In a second preferred mounting method, conventional fasteners such as rivets or lock nuts and bolts may extend through mounting holes 30 formed in support member 22 to secure the flag holder 20 to the upright 12. The guide ribs 29 may be used in this mounting method to locate the flag holder 20 for alignment in its mounting position on the upright member 12.

With reference again to FIGS. 3 and 5, the three guide pockets 26 extend outwardly from the front face 22*a* of the support member 22. The guide pocket 26 is defined by upper retainer or flange portion 32, a pair of side walls 33, and base flange 34 extending outwardly from the web 28. The guide pocket 26 locates and supports a flag staff 19 in flag holder 20 so as to define a staff receiving volume. The spring members 24 are secured within the guide pockets 26.

Base flange 34 includes a bottom wall 36 that extends outwardly from the front face 22*a*. Opposite the front face 22*a*, a lip 38 extends upwardly from the bottom wall 36 and toward the web 28 to form a slightly acute angle 40. A groove or relief 42 is formed in front face 22*a* within the guide pocket 26. In this manner, base flange 34 forms a cavity into which the spring member 24 may be "snapped" into position. As best seen in FIG. 5, the groove 42 in the front face 22*a* engages upper edge 43 of the spring member 24 for releasably securing the spring member 24 in the guide pocket 26.

As seen in FIGS. 6 and 7 of the drawings, the spring member 24 is a resilient component that accommodates various diameter flag staffs (normally ¾" and typically ranging between ⅝–13/16") and includes a vertical wall 44 and a horizontal wall 46 fabricated with a slightly obtuse angle 48 formed therebetween such that when the spring member 26 is placed into one of the guide pocket 26, the vertical wall 44 is brought into a substantially orthogonal position 50 (i.e., about 90° as shown in FIG. 5) with respect to the horizontal wall 46. By reducing the angle between the vertical and horizontal walls 44, 46, a retention force is generated in the spring member 26 to releasably retain the spring member 24 within the guide pocket 26.

A downwardly angled tab or flange 52 extends from the vertical wall 44 and functions as a retaining element to secure the flag staff 19 in the guide post 26. The downwardly angled flange 52 is resiliently deflectable and has an arcuate relief 54 formed in the free end. The radius of relief 54 is smaller than that of flag staff 19, preferably having a diameter in the range of ⅜–9/16" (approximately 50%–70% of the staff diameter), thereby allowing the comers 56 of the arcuate relief 54 to engage the staff 19 and make a positive lock therewith. As the flag staff 19 is inserted, the flange 52 deflects downwardly. Once inserted, the flange 52 and its comers 56 formed by relief 54 apply pressure on or bite into the staff 19 and frictionally prevent its upward movement. This configuration also allows the flag holder 20 to securely retain different size staffs 19.

A clamping force on the flag staff 19 is provided by a cantilevered spring element 57 comprising flange 58 which angles upwardly and inwardly and tab 62 which intersects flange 58 at corner 63. Spring element 57 works in association with the flange 52 to secure the flag staff 19 in place. The intersection of horizontal wall 46 and flange 58 creates a slightly acute angle 60. To provide sufficient freedom of movement of spring element 57, the angle 40 formed between the lip 38 of the base flange 34 is slightly greater than the angle 60 formed between the horizontal wall 46 and the flange 58. Spring element 57 is adapted to apply a clamping force onto a flag staff inserted within the flag holder 20. The clamping force may be removed by deflecting the spring element 57 away from the front face 22*a*, allowing the flag staff 19 to be removed from the flag holder 20.

The tab 62 can be depressed downwardly away from support member 22 to pull the spring element 57 away from the support member 22, thereby allowing the removal of the flag staff 19. The tab 62 is large enough to provide a surface that may be easily gripped by, for example, a worker wearing large, bulky gloves.

The web 28 of the support member 22 includes upper and lower access holes 64, 66. Lower access hole 66 provide access to each of the spring members 24. If, for instance, the spring member 24 needs to be removed from the support member 22, a tool, such as a screwdriver, may be inserted through the appropriate lower access holes 66 to press against the vertical wall 44 of the spring members 24, thereby forcing the vertical wall 44 to deflect away from the front face 22*a* and out of the groove 42. In this way, the spring member 24 may be popped out of its installed position in the guide pocket 26.

The access holes 64, 66 also reduce the weight of the flag holder 20 and facilitate manufacturing thereof. More specifically, the support member 22 may be formed using an injection molding process. Conventionally, many intricate parts have been formed by an expensive injection molding process which requires the use of cams, slides and pins. However, by aligning the access holes 64, 66 with the position of flanges 32, 34, a more simple and less expensive parting die may be used to fabricate the support member of the present invention, thereby reducing the overall cost and complexity of the molding process.

Figure 9:
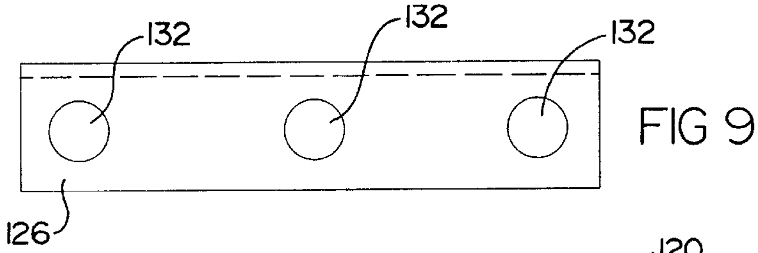
FIG. 9 is a top view of the support member as shown in FIG. 8.
Figure 8:
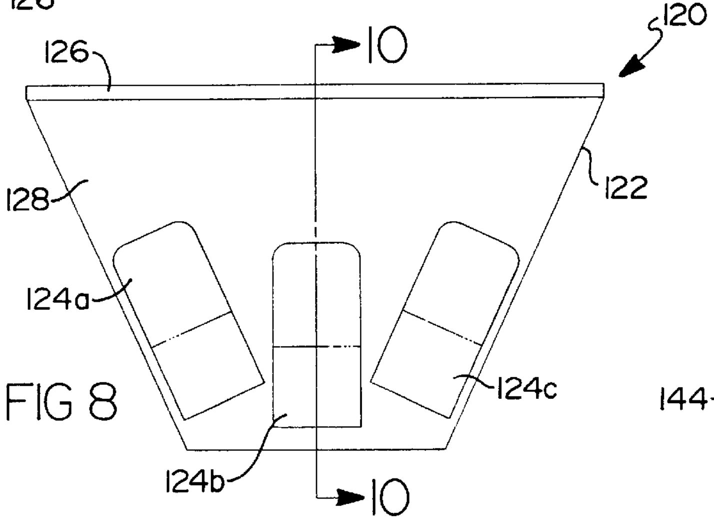
FIG. 8 is front view of the flag holder illustrating a second preferred embodiment according to the principles of the present invention.
Figure 10:
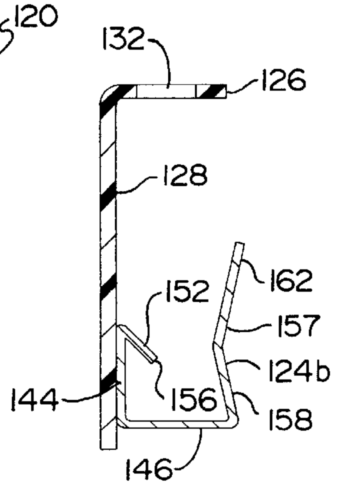
FIG. 10 is a side view of the flag holder as shown in FIG. 8.

FIGS. 8–10 illustrate an alternate embodiment of the flag holder according to the principles of the present invention. The flag holder 120 includes a support member 122 and three spring members 124*a*, 124*b*, and 124*c*. The support member 122 includes a guide flange 126 and a web 128. The spring members 124 are secured to the support member 122 by rivets (not shown) or similar known mounting mechanism, such as threaded fasteners or a suitable adhesive. Conventional fasteners 127 may extend through support member mounting holes (not shown) to secure the flag holder 120 to the upright frame 12. A flag staff 19 (not shown) may be releasably inserted through an opening 132 in the guide flange 126 of support member 122.

The spring members 124 are preferably spaced more closely to one another than are the openings 132 so that the flags staffs 19 diverge, thereby avoiding interference with one another and increasing their visibility. As presently preferred, the embodiment of FIGS. 8–10 uses a spring member configuration similar to that illustrated in FIGS. 5 and 6 of the drawings and described herein. The spring member 124 includes a generally vertical wall 144 and a horizontal wall 146. The included angle between vertical wall 144 and horizontal wall 146 is approximately 90°. An elastically deformable flange 152 extends from the vertical wall 144 downwardly towards horizontal wall 146. The downwardly angled flange 152 includes an arcuate cutout (not shown, but similar to that as shown in FIG. 7) of a radius slightly smaller than that of flag staff 19, thereby allowing the comers 156 of the arcuate cutout to engage the staff 19 and make a positive lock. As the flag staff 19 is inserted, the flange 152 may deflect slightly downwardly. Once the flag staff 19 is inserted, the flange 152 and its comers 156 bite into the staff 19 and frictionally prevent its upward movement in a manner heretofore described.

A clamping force on the flag staff 19 is provided by a cantilevered spring element 157 which includes an upwardly angled flange 158 and release tab 162. The release tab 162 can be depressed downwardly away from mounting surface 128 to bend or rotate the flange 158 away from the mounting surface 128. This deflection removes the clamping force on the flag staff 19, thus allowing it to be disengaged from the downwardly extending flange 152 and removed from the flag holder 120. The tabs 162 are large enough to provide a surface that may be easily gripped by, for example, a worker wearing large, bulky gloves.

Figure 11:
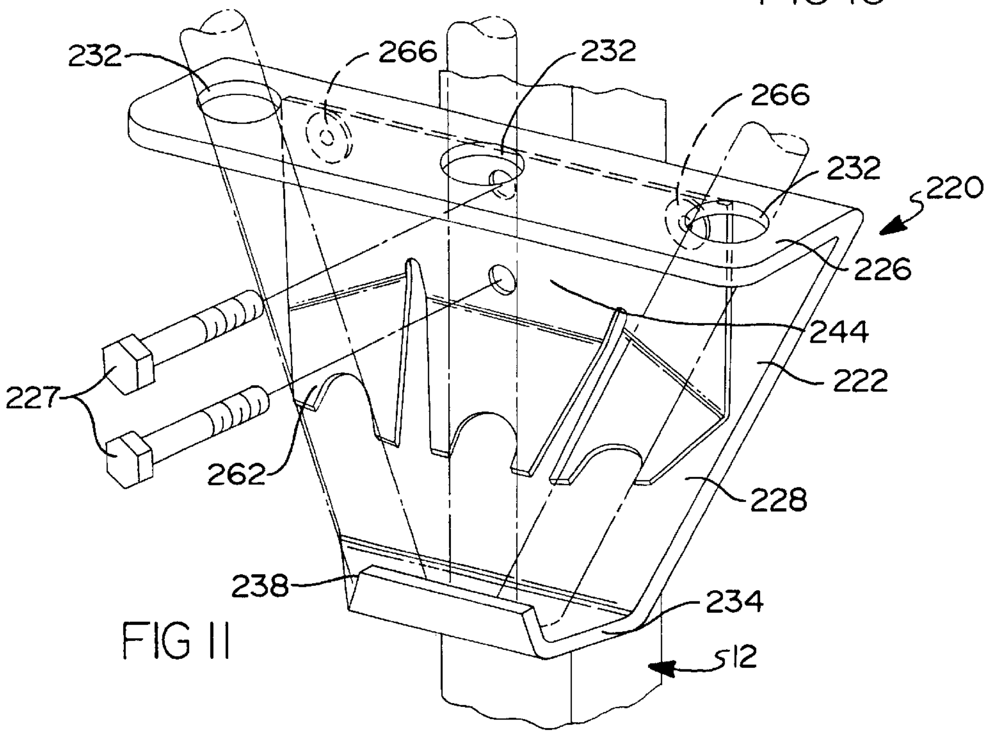
FIG. 11 is an enlarged perspective view of a flag holder according to a third preferred embodiment of the present invention.

FIGS. 11–14 illustrate another alternate embodiment of the flag holder according to the principles of the present invention. The flag holder 220 includes a support member 222 and a spring member 224. The support member 222 includes a guide flange 226, a mounting surface 228, and a base flange 234. The spring member 224 has a vertical wall 244 for mounting to the support member 222 and a release tab section 262, which includes three tab portions 262*a*, 262*b*, and 262*c*. As seen in FIGS. 11, 12, and 14, each tab portion 262*a*, 262*b*, and 262*c* is a downwardly angled flange extending away from the mounting surface 228 of the support member 222. Arcuate reliefs 254*a*, 254*b* and 254*c* which are complementary to the flag staff 19 are formed in the free end of each tab portion 262.

The spring member 224 is secured to the support member by rivets 266, as shown in FIGS. 11–12, or by similar known mounting mechanism, such as threaded fasteners or a suitable adhesive. Conventional fasteners 227 extend through spring member mounting holes 229 and through support member mounting holes 230 to secure the flag holder 220 to the upright 12.

An opening 232 formed in the guide flange 226 of support member 222 is adapted to receive a flag staff 19. Staff 19 also passes through the release tab portions 262 of spring member 224 by way of arcuate relief 254. The release tabs 262, and thus reliefs 254, are preferably spaced more closely to one another than are the openings 232 so that the flags staffs 19 diverge, thereby avoiding interference with one another and increasing their visibility.

The release tab portion 262 of the spring member 224 are elastically deformable such that they resiliently deflect downward to allow a staff 19 to be inserted into the flag holder 220. Each relief 254 preferably has a configuration such that it engages the perimeter of the staff 19. Once the staff 19 is inserted, engagement with the spring member 224 prevents its upward removal. The release tab portion 262 exerts a frictional force on the staffs 19 and works in association with the base flange 234 of support member 222 to secure the flags in the flag holder 220. The bottom of each flag staff 19 is seated in the flag holder 220 in such a way that it abuts the base flange 234 of support member 222. As shown in the preferred embodiment of FIGS. 11–14, the base flange 234 is formed so that a vertical lip 238 constrains the bottom of each staff 19 in a direction which opposes the force exerted by the release tab 262. The flag staff 19 can be removed by manually depressing the release tab 262 downwardly towards the mounting surface 228 so that it no longer engages the staff 19, thereby allowing it to be freely removed.

FIGS. 15–17 illustrate an alternate embodiment of the flag holder according to the principles of the present invention. The flag holder 320 includes a support member 322 and three spring members 324*a*, 324*b*, and 324*c*. The support member 322 includes a guide flange 326, a mounting surface 328, and a base flange 334. A plurality of openings 332 are found in the guide flange 326.

The spring members 324 include a vertical wall 344 secured to the support member 322 by rivets 366, as shown in the FIGS. 15–17, or by similar known mounting mechanism, such as threaded fasteners or a suitable adhesive. Conventional fasteners (not shown) extend through center spring member mounting holes (not shown) and support member mounting holes to secure the flag holder 320 to the upright frame 12. A release tab 362 extends downwardly and outwardly from the vertical wall 344. An aperture 354 is formed in the release tab 362 for receiving a flag staff 19. The release tabs 362 of the spring member 324 are elastically deformable such that they resiliently deflect downward to allow a staff 19 to be inserted into the flag holder 320. Each aperture 354 preferably has an arcuate configuration such that it engages the perimeter of the staff 19.

Flag staff 19 is releasably inserted through the opening 332 in the guide flange 326 of support member 322. Staff 19 also passes through apertures 354. The release tabs 362, and thus aperture 354, are preferably spaced more closely to one another than are the openings 332 so that the flags staffs 19 diverge, thereby avoiding interference with one another and increasing their visibility.

The release tab portions 362 engage the staff 19 and exert a frictional force on the staffs 19. The base flange 334 of support member 322 also constrains the flag staff 19 in the flag holder 320. The bottom of each flag staff 19 is seated in the flag holder 320 in such a way that it abuts the base flange 334 of support member 322. As shown in the preferred embodiment of FIGS. 15–17 of the drawings, the base flange 334 is formed so that a generally vertical lip 338 reacts the force exerted by the release tabs 362, thereby clamping the staffs 19 in the flag holder 320. An outwardly curved portion 339 is formed at the top edge of the lip 338 to facilitate insertion of the flag staff 19 into the flag holder 320.

The flag staff 19 can be removed by manually depressing the release tabs 362 downwardly so that it no longer engages the staff 19, thereby allowing it to be freely removed. The spring member 324 is flexible such that the flag holder 320 is able to accommodate flag staffs 19 through ranges of varying diameter.

FIGS. 18–20 illustrate yet another alternate embodiment of the flag holder according to the principles of the present invention. The flag holder 420 includes a support member 422 and a spring member 424. The support member 422 includes a guide flange 426, a mounting surface 428, and a base flange 434. Openings 432 are formed in guide flange 426 and adapted to receive flag staff 19.

The spring member 424 has a horizontal wall 443 for securing the guide flange 426, a vertical wall portion 444 and a release tab section 462, which includes three tab portions 462*a*, 462*b*, and 462*c*. As seen in FIGS. 18, 19, and 20, the tab portion 462 is a flange which is angled downwardly toward the base flange 434 and inwardly toward the mounting surface 428. Conventional fasteners 427 extend through support member mounting holes formed in the support member 422 to secure the flag holder 420 to the upright 12.

The release tab portions 462 of the spring member 424 are elastically deformable such that they resiliently deflect downward to allow a staff 19 to be inserted into the flag holder 420. A relief 454 formed in tab 462 preferably has an arcuate configuration such that it engages the perimeter of the staff 19. The release tabs 462, and thus relief 454, are preferably spaced more closely to one another than are the openings 432 so that the flags staffs 19 diverge, thereby avoiding interference with one another and increasing their visibility.

Staff 19 may be inserted through the opening 432 of guide flange 426 and through relief 454 of spring member 424. The release tab portions 462 exert a frictional force on the staffs 19 and work in association with the base flange 434 of support member 422 to secure the flags in the flag holder 420. The bottom of each flag staff 19 is seated in the in the flag holder 420 in such a way that it abuts the base flange 434 of support member 422.

The flag staff 19 can be removed by manually depressing the release tab 462 downwardly such that it no longer engages the staff 19, thereby allowing it to be freely removed. The spring member 424 is flexible such that the flag holder 420 is able to accommodate flag staffs 19 through ranges of varying diameter.

As presently preferred, the support member of each embodiment is formed of a lightweight plastic material which is readily formable into the desired shape. The spring member is preferably formed of a spring steel or other suitable material. The tabs of the spring member are elastically deformable to allow resilient downward deflection during installation and removal of the flag staffs. The design of the flag holder in accordance with the present invention allows the flags to be firmly secured in place by the association of the spring member with the support member. As such, the need for an additional clamping bracket is rendered unnecessary. This allows the flag holder of the present invention to be lighter than other lock systems while maintaining its ability to secure the flags in place. The present invention also makes it more convenient to set-up, since no locking bracket assembly of threaded fasteners are required.

From the foregoing description of the preferred embodiments, it will be readily apparent that certain variations, modifications, or alterations may be made therein. Such variations are not to be regarded as a departure from the spirit and scope of the invention.

What is claimed is:

1. A flag holder for use on a sign stand comprising:

a support member adaptable to secure the flag holder to a sign stand, said support member including a guide flange extending from a first surface of said support member and having an aperture formed therethrough, and a base flange extending from said first surface and a guide pocket defined by a projection of said aperture onto said base flange adapted to receive a flag staff; and a spring member secured to said support member and having a spring tab extending into said guide pocket, said spring tab being resiliently deflectable within said guide pocket.

2. The flag holder of claim 1 wherein said spring member comprises a wall portion engaging said support member and a tab portion extending from an edge of said wall portion at a downward angle towards said base flange, said tab portion having an arcuate relief formed therein for receiving a flag staff.

3. The flag holder of claim 2 wherein said wall portion engages said first surface and said tab portion extends downwardly away from said wall portion.

4. The flag holder of claim 3 wherein said spring member further comprises a spring element positioned opposite said tab portion for applying a clamping force to a flag staff.

5. The flag holder of claim 4 wherein said spring element comprises:

a spring flange extending upwardly from said base towards said guide flange and inwardly towards said wall portion; and a release tab extending upwardly from said spring flange towards said guide flange and outwardly away from said wall portion.

6. The flag holder of claim 1 wherein said guide flange has a plurality of apertures formed therethrough and defining a plurality of guide pockets, and a spring member having a plurality of spring tabs, each of said plurality of spring tabs extending into one of said plurality of guide pockets.

7. A flag holder for a sign assembly comprising:

a support member having a guide pocket extending from a front surface and including an upper retainer and a base flange; and a spring member disposed in said guide pocket, said spring member including a retaining tab located within said guide pocket adjacent said front surface and having a free end extending outwardly from said front surface, and a spring element located within said guide pocket opposite said front surface, said spring element being resiliently positionable within said guide pocket to generate a clamping force against said retaining tab for releasably securing a flag staff in said support member.

8. The flag holder of claim 7 wherein said retaining tab has an arcuate relief formed in said free end.

9. The flag holder of claim 7 wherein said spring member further comprises a wall portion abutting said front surface and a base portion abutting said base flange, said retaining tab extending from a top edge of said wall portion, and said spring element extending from an outer edge of said base portion.

10. The flag holder of claim 9 wherein said front surface has a relief formed therein to receive said wall portion such that said spring member is releasably retained in said guide pocket.

11. The flag holder of claim 10 wherein said spring member generates a retention force for releasably retaining said spring member in said guide pocket.

12. The flag holder of claim 7 wherein said spring element comprises a flange portion extending inwardly toward said front surface and a tab portion extending outwardly away from said front surface.

13. The flag holder of claim 7 wherein said base flange comprises a bottom wall extending outwardly from said front face and a lip extending upwardly from said bottom wall.

14. The flag holder of claim 13 wherein said guide pocket further comprises a pair of side walls extending outwardly from said font surface and interconnecting said upper retainer and said base flange.

15. The flag holder of claim 13 wherein said support member has an access hole formed therethrough adjacent said base flange.

16. The flag holder of claim 7 wherein said support member has an access hole formed therethrough adjacent said upper retainer.

17. The flag holder of claim 7 wherein said support member has a pair of guide ribs formed on a back surface thereof to provide a locating surface on the flag holder.

18. The flag holder of claim 7 wherein said flag holder further comprises a plurality of guide pockets extending from said front surface of said support member and interconnected by a web, each of said plurality of guide pockets having a spring member disposed therein.

19. A flag holder for a sign assembly comprising:

a support member having a guide pocket extending from a front surface, said guide pocket including an upper retainer, a base flange having a bottom wall extending outwardly from said front face and a lip extending upwardly from said bottom wall, and a pair of side walls extending outwardly from said front surface and interconnecting said upper retainer and said base flange, said front surface having a relief formed therein between said pair of side walls; and a spring member including a wall portion disposed in said relief, a retaining tab extending from a top edge of said wall portion, a base portion extending from a bottom edge of said wall portion and abutting said bottom wall, and a spring element having a flange portion extending from an outer edge of said base portion inwardly toward said front surface and a tab portion extending from a top edge of said flange portion outwardly away from said front surface, said spring element being resiliently positionable within said guide pocket to generate a clamping force against said retaining tab for releasably securing a flag staff in said support member.

20. The flag holder of claim 19 wherein said flag holder further comprises a plurality of guide pockets extending from said front surface of said support member and interconnected by a web, each of said plurality of guide pockets having a spring member disposed therein.

* * * * *